US006330575B1

(12) United States Patent
Moore et al.

(10) Patent No.: US 6,330,575 B1
(45) Date of Patent: *Dec. 11, 2001

(54) WEB COMMERCE TOOL KIT FOR DISTRIBUTED PAYMENT PROCESSING

(75) Inventors: Victor S. Moore, Boynton Beach; Glen R. Walters, Sebring, both of FL (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,326

(22) Filed: Mar. 31, 1998

(51) Int. Cl.[7] ..................................................... G06F 17/30
(52) U.S. Cl. ............................ 707/513; 709/223; 709/224
(58) Field of Search .................................. 707/513, 500, 707/505, 506–507, 517, 515, 526; 705/1, 22, 26, 27, 35, 44; 345/115, 326, 352, 146; 709/200, 223–224, 201, 203, 101

(56) References Cited

U.S. PATENT DOCUMENTS

| | | | |
|---|---|---|---|
| 5,835,914 | * | 11/1998 | Brim ..................................... 707/206 |
| 5,895,454 | * | 4/1999 | Harrington ............................. 705/26 |
| 5,937,160 | * | 8/1999 | Davis et al. ..................... 395/200.33 |
| 5,940,834 | * | 8/1999 | Pinard et al. ......................... 707/102 |
| 5,963,924 | * | 10/1999 | Williams et al. ....................... 705/40 |
| 5,983,245 | * | 11/1999 | Newman et al. ..................... 707/513 |

OTHER PUBLICATIONS

Oliver et al., Netscape 2 Unleashed, Sams Net, p 261, Feb. 1996.*
U.S. application No. 09/052,316, Moore et al., filed Mar. 31, 1998.
International Telecommunication Union—ITU–T Recommendation Q.703 (3/93) Specifications of Signalling System No. 7—Signalling Link.

* cited by examiner

Primary Examiner—Hosain T. Alam
Assistant Examiner—Alford W. Kindred
(74) Attorney, Agent, or Firm—Fleit, Kain, Gibbons, Gutman & Bongini P.L.; Jon A. Gibbons

(57) ABSTRACT

Methods and systems for designing a Web page, to be hosted on a Web page server. The development applications provide an object-oriented, template-driven interface for a customer or merchant to utilize in the design of a Web page or a complete Web site. The Web site produced allows the merchant to become a part of a distributed electronic commerce system or Internet commerce system for doing business on the World Wide Web. The design tool can be implemented in a Java application or applet.

24 Claims, 17 Drawing Sheets

WEB COMMERCE TOOL KIT FOR DISTRIBUTED PAYMENT PROCESSING

CROSS-REFERENCE TO RELATED APPLICATIONS

Not applicable.

BACKGROUND OF THE INVENTION

1. Field of the Invention.

The present invention relates generally to computer networks and more particularly to methods and apparatus for providing a scalable distributed Internet commerce system.

2. Description of the Related Art.

Another U.S. Pat. Application dealing with related technology has been filed on even date herewith. That application is entitled "A Method and Apparatus for Creating a Distributed Electronic Commerce System" by Victor S. Moore and Glen R. Walters and is assigned to International Business Machines ("IBM") with an IBM reference number of BC9-98-031 (referred to hereinafter as the "Distributed Commerce System Patent").

The World-Wide-Web ("Web") has become immensely popular largely because of the ease of finding information and the user-friendliness of today's browsers. A feature known as hypertext allows a user to access information from one Web page to another by simply pointing (using a pointing device such as a mouse) at the hypertext and clicking. Another feature that makes the Web attractive is having the ability to process the information (or content) in remote Web pages without the requirement of having a specialized application program for each kind of content accessed. Thus, the same content is viewed across different platforms. Browser technology has evolved to enable the running of applications that manipulate this content across platforms.

The Web relies on an application protocol called HTML (Hyper-Text Mark Up Language), which is an interpretative scripting language, for rendering text, graphics, images, audio, real-time video, and other types of content on a Web compliant browser. HTML is independent of client operating systems. Therefore, HTML renders the same content across a wide variety of software and hardware operating platforms. The software platforms include without limitation Windows 3.1, Windows NT, Apple's Copeland and Macintosh, and IBM's AIX and OS/2, and HP Unix. Popular compliant Web-Browsers include without limitation Microsoft's Internet Explorer, Netscape Navigator, Lynx, and Mosaic. HTML interprets links to files, images, sound clips, and other types of content through the use of hypertext links. Upon user invocation of a hypertext link to a Web page, the browser initiates a network request to receive the desired Web page.

The use of electronic commerce on the Web is growing. A variety of traditional larger retailers and larger mail order catalog companies have been offering their goods for sale electronically over the Web. Everything from the actual shopping to the determination of available inventory and the acceptance of payment is accomplished electronically. The merchant's Web site or Web storefront handles all shopping, selection, and acceptance of payment transactions automatically. Unlike traditional storefronts, these automatic capabilities enable a merchant to have its goods offered for sale twenty four hours a day, every day of the year (for an example of a traditional catalog company with its goods available via the Web refer to L.L. BEAN of Freeport, Maine, whose URL is www.llbean.com). But the ability to host retail merchandise on the Web is not without difficulties.

It is difficult to integrate the major functions of electronic Web commerce. Three functions, in particular, are typically integrated in a retail Web site. The first function is the virtual presentation, using text, graphics, or otherwise, of a merchant's products to customers. This is sometimes called the "electronic storefront" or "Web storefront," or in the case of a catalog merchant, the "electronic catalog." The second function is the maintenance of inventory, stock, pricing, and availability of each product, as well as tracking sales and revenues. The third function is performing the electronic transactions for payment in a secure environment, where the collection of a customer's payment information, such as a credit card, is performed. Typically, most electronic commerce sites integrate all three of these functions at one physical site.

Companies desiring to do business over the Web face many problems. A first problem is the expense and complexity of setting up the necessary elements of an electronic commerce server. This difficulty includes: (1) hosting of the Web storefront; (2) maintenance of an inventory and financial database; and (3) the roll out of a secured Transaction Server. The initial up-front cost is a significant barrier for most small businesses desiring to gain a presence on the Web. Therefore, a need exists to lower or even to eliminate the high-cost barrier typically associated with setting up electronic commerce on the Web. The cost not only involves software design and implementation, and setting up the necessary equipment, but the initial hardware investment capable of running all three elements of an electronic commerce server for one business.

A second problem is meeting the requirement that the Web storefront or Web catalog be constantly up-to-date. Many businesses pay dedicated personnel to update, create, and modify their Web sites. The cost of the service to maintain a merchant's Web site can be significant. A need exists to provide a merchant with the capability of easily creating, modifying, and updating its own Web storefront.

A third problem is meeting the requirement that the Web storefront inventory and financial database must be maintained and updated. Sales, advertised specials, and other changes in pricing need to be reflected in the inventory database. For many smaller businesses the requirement to keep inventory and financial records electronically, not to mention the requirement to be electronically connected to their Web storefront, is too complex and too costly. Many smaller businesses use simple written ledgers or standalone software applications to control their inventories and finances. For merchants desiring to sell goods and services over the Internet, a need exists to be able to have their inventory and finances maintained in a scalable fashion. In this way, as the business grows, the merchant can migrate from a pencil and ledger, through a stand-alone electronic database, up to a fully connected and automated database.

A fourth problem is meeting the requirement to automatically accept secure, electronic forms of payments. The need to have encryption and clearance software, secure server hardware, and secure firewalls makes this requirement expensive. For merchants desiring to set up Web storefronts, a need exists to be able to scale electronic payments to meet their needs.

A fifth problem is achieving the ability to advertise to news groups and other Internet text-based users, as opposed to graphics-based users. Popular text-only viewers such as Lynx do not have graphical HTML capabilities. A need thus exists for merchants to be able to advertise anywhere and to process payment information even in text-only based electronic commerce.

As mentioned earlier, one of the concerns for a merchant desiring to do electronic commerce is the Web site development. In the case of a large company that wants to have all three functions integrated into one Web site, these costs can easily exceed $1 million. In addition, even though the programming will usually not be done by the merchant, the merchant will have to devote substantial amounts of time to the layout design and to the review. These costs, in time and money, are significant. Smaller companies may opt to create their own Web sites. This undertaking can be quite difficult, however, for the merchant who is not a sophisticated computer user. While it is relatively easy to create a Web site, without competent guidance the site may be poorly designed and therefore of little economic value. There is, therefore, a need for a development tool which simplifies the design, creation, and maintenance of a Web site for merchants.

SUMMARY OF THE INVENTION

Briefly, according to the invention a method for designing a Web page, to be hosted on a Web page server, comprises: providing an object-oriented, template-driven interface for a customer to utilize in the design of the Web page. This allows the customer, through the use of the interface, to design the Web page. The method also comprises the step of publishing the Web page at a destination of the customer's choosing.

Briefly, in accordance with another aspect of the invention, a method for designing a Web page for use in a distributed electronic commerce system is provided. The commerce system comprises a Web page server and a second server which are electrically coupled to each other, and the Web page server hosts the Web page. The method comprises: creating a link to the second server; designing the Web page such that the link can be embedded into the Web page; and embedding the link into the Web page.

Briefly, in accordance with other aspects of the invention, computer readable media contain program instructions for implementing the above methods.

Briefly, in accordance with other aspects of the invention, Web page design systems implement the above methods.

BRIEF DESCRIPTION OF THE DRAWING(S)

DETAILED DESCRIPTION OF AN EMBODIMENT

1. Introduction and Overview

Figure 1:
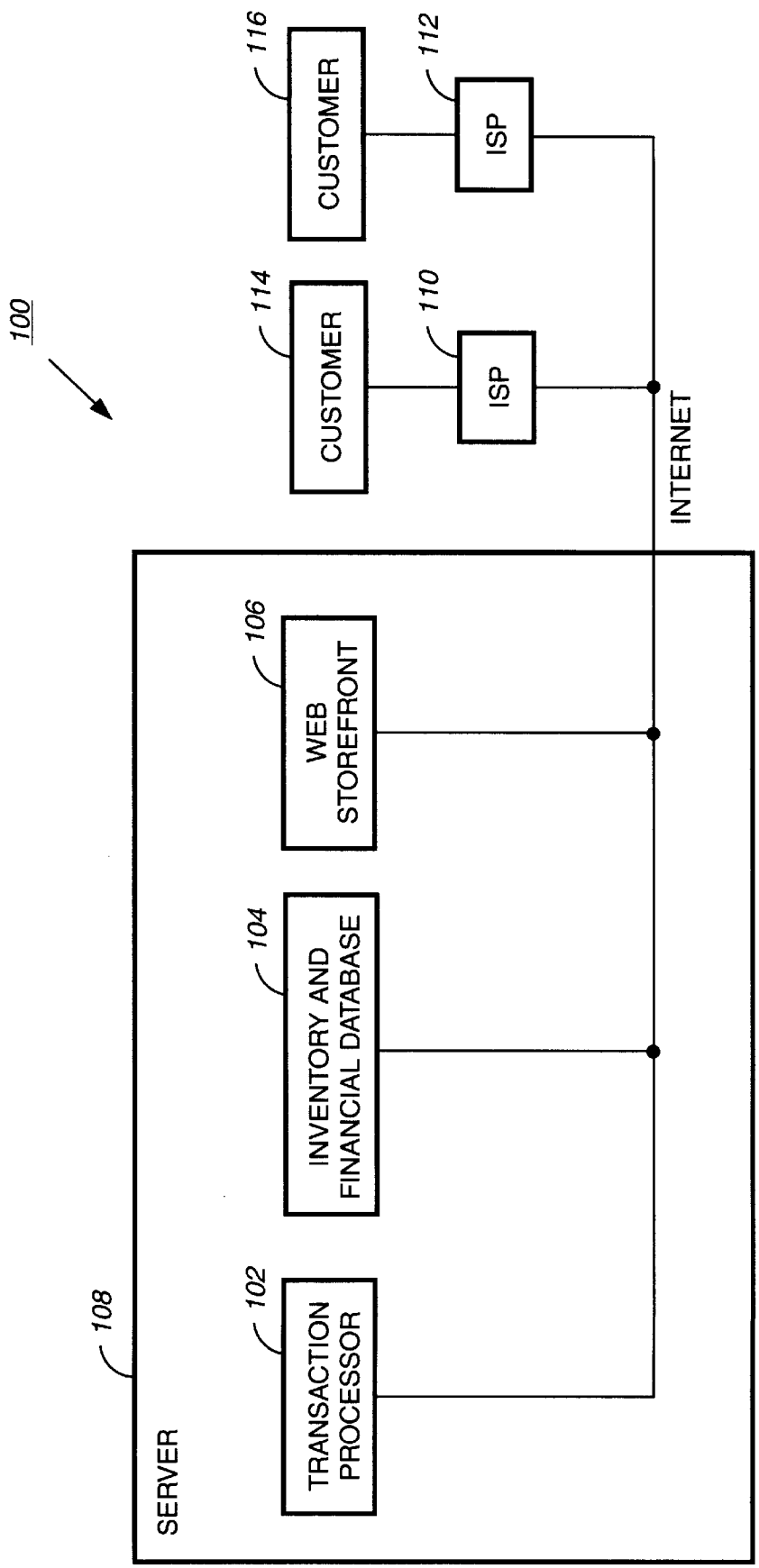
FIG. 1 is a functional block diagram of a non-distributed electronic commerce system for the World Wide Web ("WWW"), according to the prior art.

Referring to FIG. 1, there is shown a system 100, according to the prior art, in which the three functions of product presentation, database management, and transaction processing are contained in one server 108 and are, therefore, not distributed. The server 108 refers to a specific computer. These three functions are performed by the Web storefront 106, the inventory and financial database 104, and the Transaction Server 102, respectively. An example of a provider of this type of non-distributed service is Net.Commerce. It is quite possible, however, to distribute the three functions amongst two or more separate servers.

FIG. 1 also illustrates a functional diagram of a computer network for World Wide Web ("WWW") access from customers 114, 116 to the server 108. Access to the server 108 can be accomplished directly through a local Internet Service Provider ("ISP") 110, or through an on-line service provider ("OLSP") 112 such as CompuServe, Prodigy, or America Online.

Figure 2:
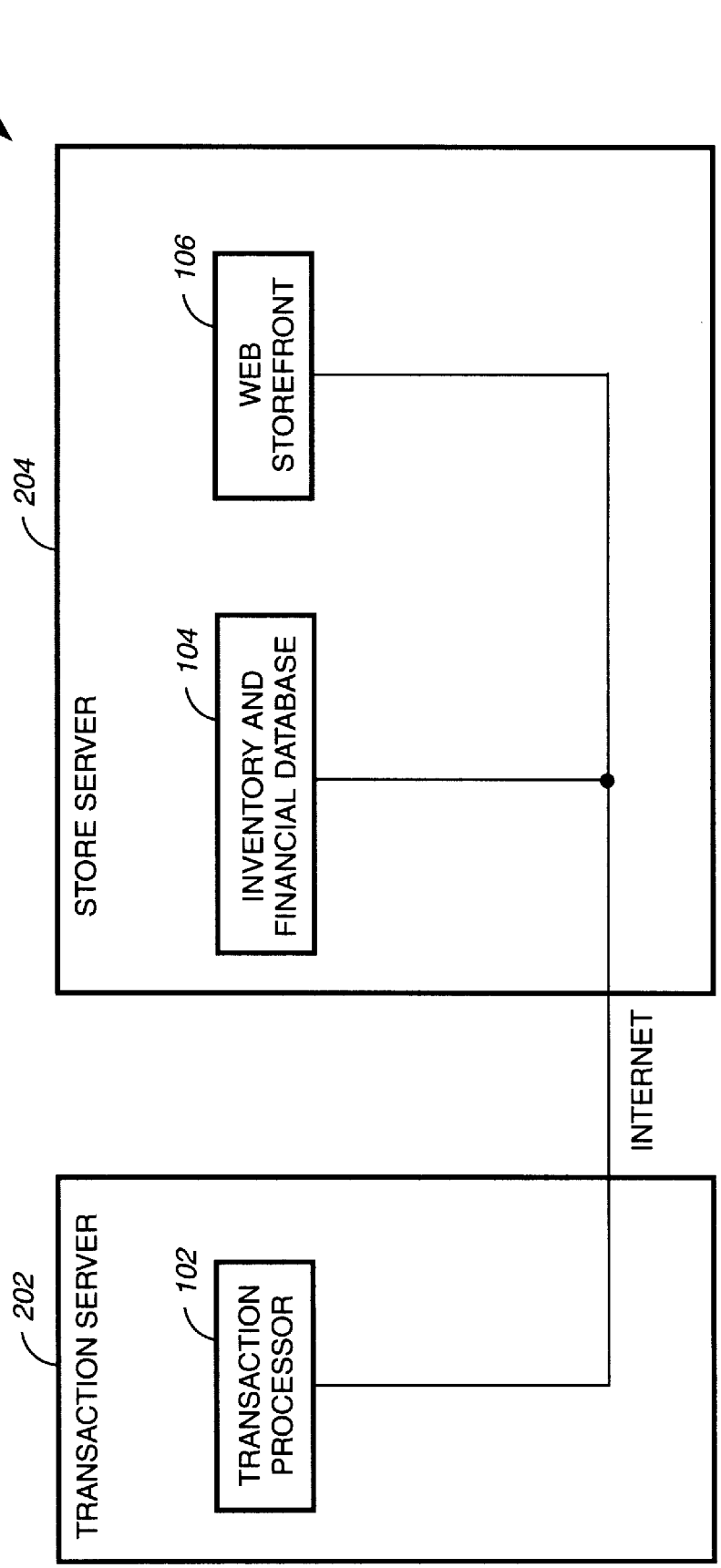
FIG. 2 is a functional block diagram of a distributed electronic commerce system for the WWW, according to the present invention.

In the Distributed Commerce System Patent, which is incorporated herein by reference, there is disclosed a distributed electronic commerce system. One method of distributing the electronic commerce functions is to separate out the function of the Transaction Server from the Web storefront and the inventory and financial database. Referring to FIG. 2, there is shown a system 200 containing a Transaction Processor 102 on one server (the Transaction Server 202), and a Web storefront 106 and inventory and financial database 104 both on a second server (the Store Server 204). This may be desirable, for instance, when the Web merchant desires to maintain its own Web storefront, whether due to the merchant's expertise, physical distance from the transaction service provider, or otherwise. Such a merchant could use any of the many hosting service providers such as CyberGate, Magg.Net, and UUNet.

Figure 3:
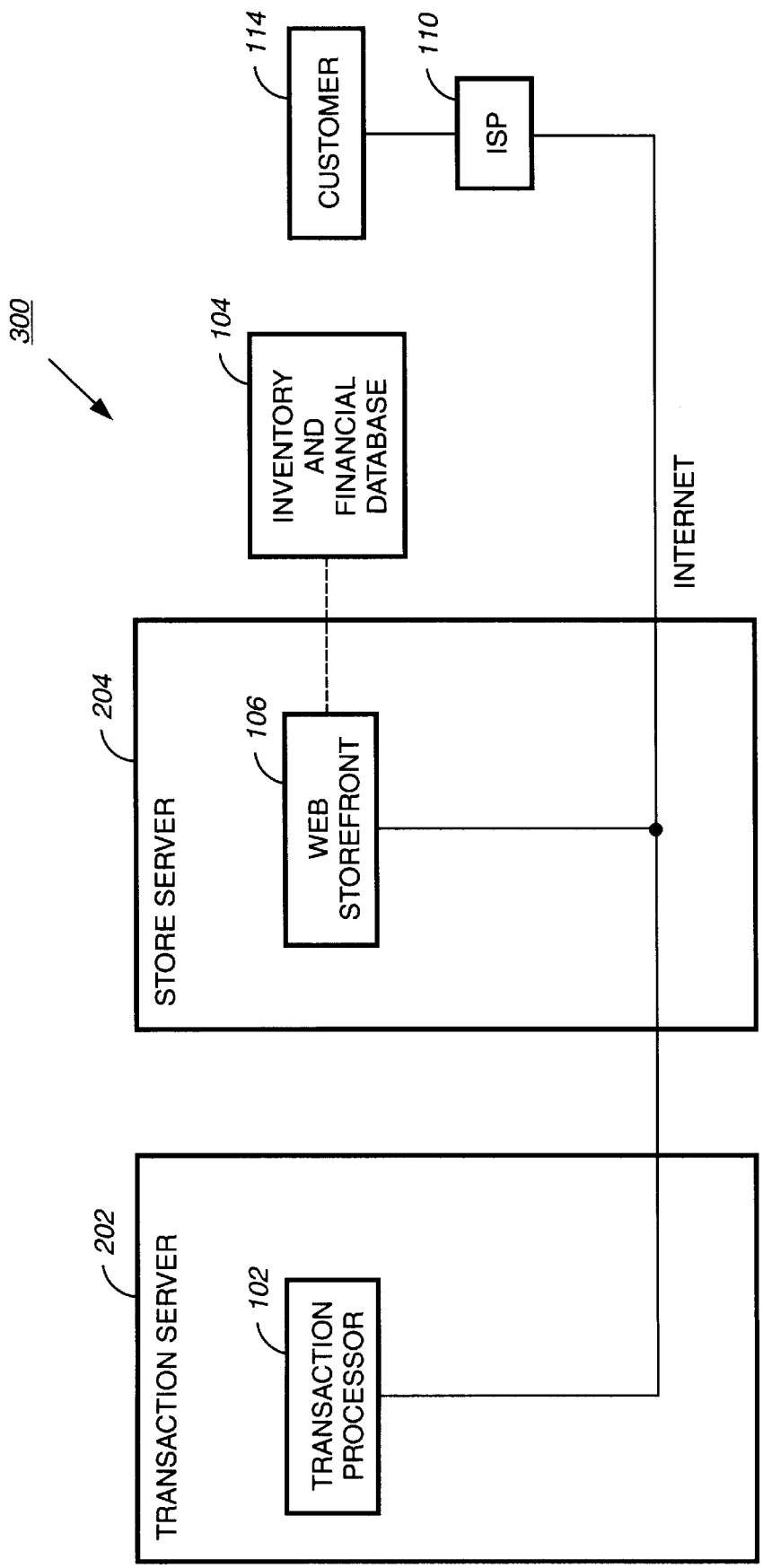
FIG. 3 is a functional block diagram of another distributed electronic commerce system for the WWW, according to the present invention.

FIG. 3 shows a system 300 with a further distribution, in which the database 104 is not on-line. The dashed line in FIG. 3 indicates that the inventory and financial system may or may not be electrically connected to the server. A computerized system could have an electrical interface to the server and not be located on the server itself. Alternatively, the inventory and financial system may be stand alone. This may be the case if the Web merchant does not have a computerized inventory and financial database system, or if the merchant has a computerized database system but simply does not have it connected to the server.

Referring to FIG. 2, the Store Server 204 is a conventional HTTPd (Hyper-Text Transfer Protocol daemon). In the preferred embodiment, it is a Sun Microsystems's Java compliant HTTPd server running Java compliant supporting standard servlet interfaces such as Netscape Java Server software or Lotus Domino Go Java software. By using a Java compliant implementation, the same code can run on a variety of operating systems supporting the Java Virtual Machine including without limitation Solaris, Unix, AIX, OS/2, and Windows 95/NT operating systems.

As an overview, and referring to FIG. 3, the Transaction Server 202 now does not host the Web storefront 106. However, the Transaction Server 202 need not store any of the inventory or financial data nor any other information on the product line of the merchant. All the information that the Transaction Server 202 needs in order to process a purchase (for example, from customer 114) is sent to it every time that a purchase is requested. The Transaction Server 202 verifies that the customer 114 wants to make a purchase of a specific "shopping basket" of products and prompts the customer 114 for payment information. Either the merchant or the Transaction Server 202 can perform the tasks of credit card verification, authorization of the total purchase amount, and funds transfer. When the Transaction Server 202 has finished its tasks, it then provides the merchant with a status report of the transaction and the customer with a confirmation.

The Web storefront 106 acts as the virtual store for the customer 114, and contains whatever information the merchant has built into the Web-site (e.g. pictures, prices, search engines, etc.). There is provided, according to the present invention, a Development Tool for designing the Web storefront 106. This tool greatly simplifies the task of creating the Web storefront initially and of modifying it and updating it. The Tool also ensures that the operation with the Transaction Server 202 is seamless for the customer 114.

The Tool derives much of its utility from the fact that it contains a series of templates, tailored to different industries, for creating pages. The fields on these templates can be filled with text, or with images from clip art (also included with the tool) or can be tailored to suit a specific merchant's needs. The task is greatly simplified by the inclusion of a prompting mode in which the tool will actually step a user through the process. As an additional tailoring feature, the tool can be adapted to whatever "look and feel" the customer may desire. The customer may want to match the look and feel to that of other applications that the customer uses, or may simply feel more comfortable with another look and feel.

Figure 4:
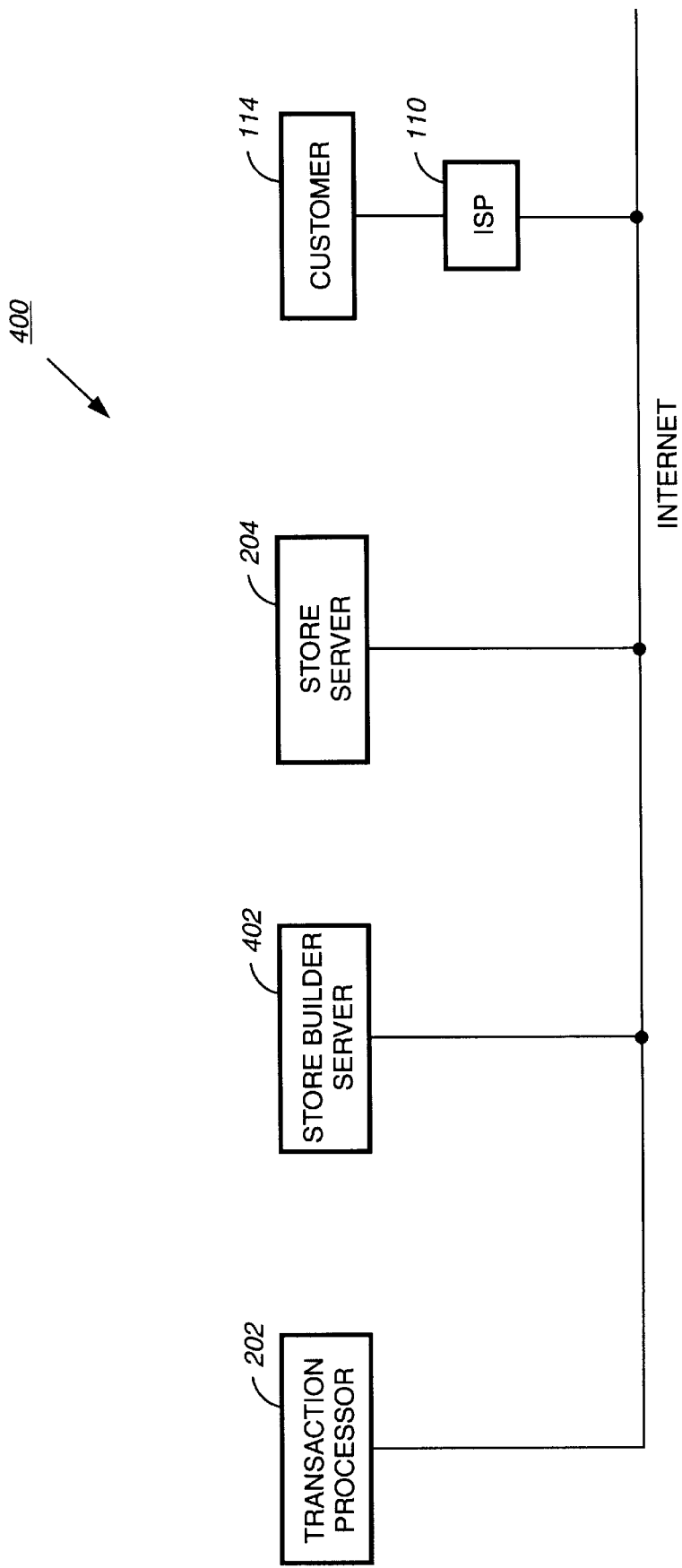
FIG. 4 is a functional block diagram of another distributed electronic commerce system for the WWW, according to the present invention.

The Tool, as either an applet which would run on top of a browser or as an application, would be downloaded from a Store Builder Server. Referring to FIG. 4, there is shown a distributed electronic commerce system 400 with a Store Builder Server 402. The merchant could download the Java wizard applet to build the pages for the Web storefront, which will reside on the Store Server 204. The Store Builder Server 402 would also contain Java servlets that would receive the HTML from the wizard applet for the storefront pages that the merchant designed and would build the store pages from this HTML. This, of course, would happen when the merchant initially designed the pages, or whenever the merchant updated or modified them. The servlet, on the Store Builder Server 402, would then publish the Web storefront pages wherever the merchant designates. The commerce system is thereby distributed even more, by separating (if desired) the tasks associated with designing the merchant's Web site. In alternate embodiments, the Tool could be downloaded from the Transaction Server 206 or obtained on a CD ROM or other recordable medium. A more detailed description of the Development Tool is given in section 5 of this disclosure, following a discussion of the operation and components of the distributed electronic commerce system of the Distributed Commerce System Patent mentioned earlier.

2. Detailed Description of the Shopping Flow

Figure 5A:
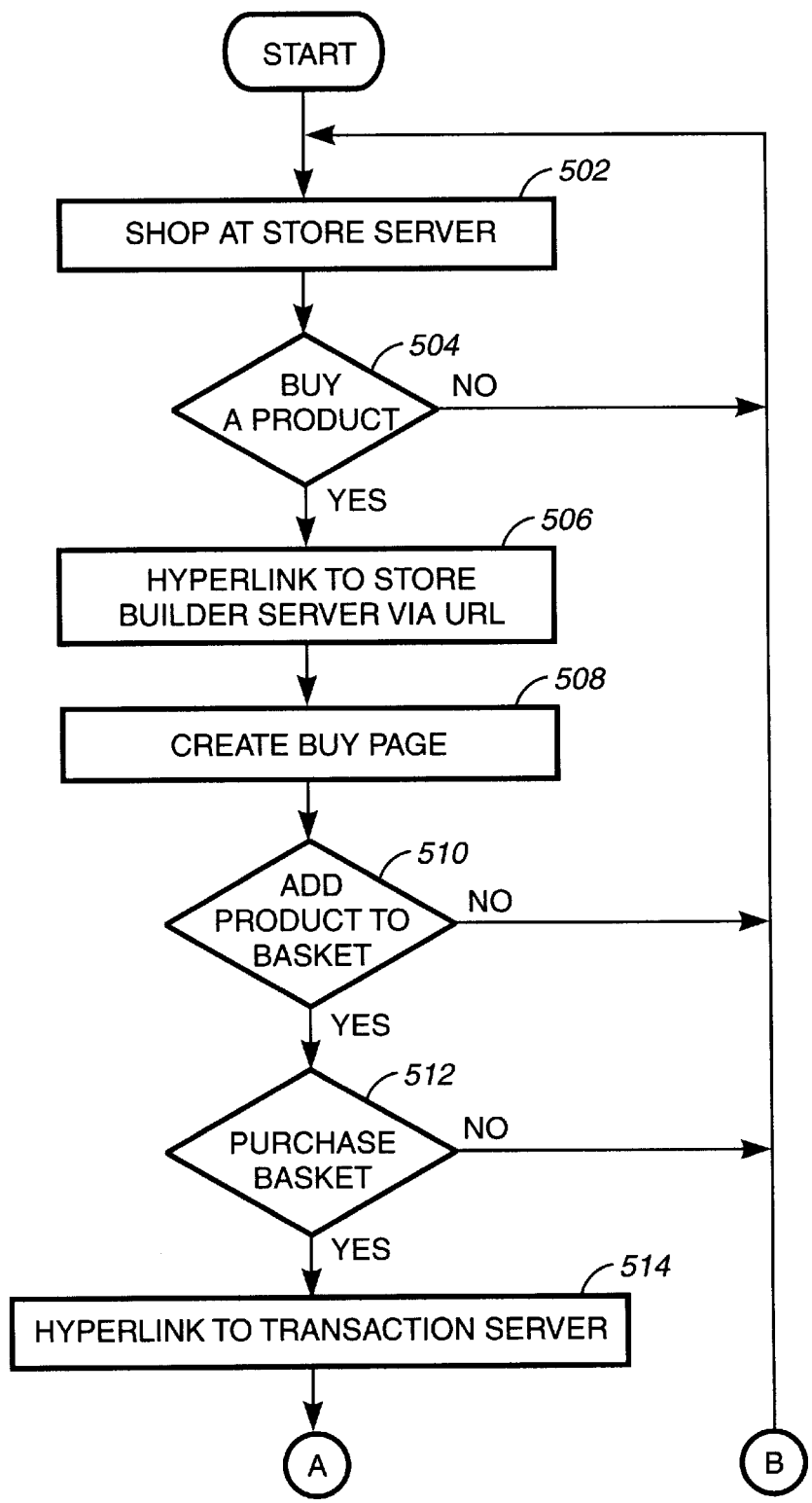
FIG. 5 is a flow diagram of the functions that are performed in a typical shopping experience by a WWW customer using the distributed electronic commerce system depicted in FIG. 4.
Figure 5B:
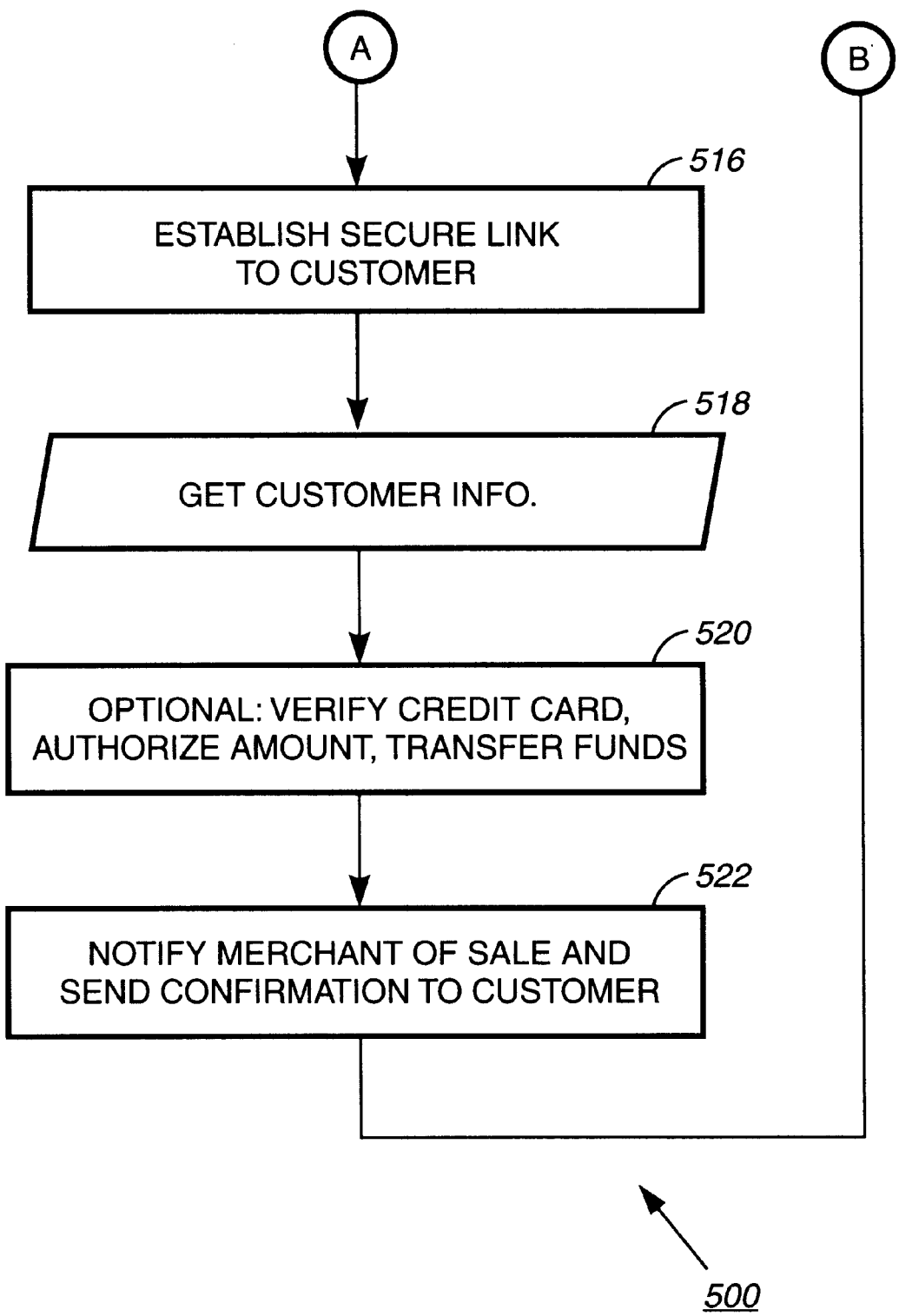

Referring to FIG. 5, flow diagram 500 illustrates the high-level functions that each of the servers (see FIG. 4), or each of the Web sites hosted thereon, performs in a typical shopping experience of a customer.

The customer, using a browser, goes to the Store Server and begins shopping, that is, browsing the content of the Web storefront 502. When the customer finds a product that the customer would like to buy, he selects that product 504. The Store Server then jumps to the Store Builder Server by using a Uniform Resource Locator ("URL") 506. The URL, called a price URL, contains all of the relevant information on the product, and all the information necessary to build a "Buy Page." The relevant product information includes a picture of the product, the product's price, and a description of the product.

The Store-Builder Server receives the price URL, which is encrypted, and a Java "Buy Page" servlet builds a Buy Page from the received HTML 508. The customer can now either accept by selecting the option that puts the product in the customer's "shopping basket," or cancel the buy 510. If the buy operation is canceled, then the customer is returned to the Store Server and can continue shopping. If the buy operation is accepted the Store Builder Server then presents the customer with his entire shopping basket up to that point, which the Store Builder Server creates and maintains. The customer can now delete items from the basket, change the quantities, "purchase" the entire basket, or return to the Store Server to continue shopping 512. It should be clear that the previous buy operation was equivalent to dropping the product in the shopping basket, and the purchase operation is equivalent to going to the check-out counter. The Java servlet that maintains the shopping basket could use any of a variety of means, including without limitation tracking the Web customer's browser address or prompting the customer for a name, for keeping track of which customer belongs to which basket.

The customer leaves his shopping basket page by either making a purchase or continuing shopping. If the customer decides to make the purchase, he is hyperlinked to the Transaction Server 514. The Transaction Server, thus, is not involved until money is ready to be transferred. The Transaction Server, therefore, immediately establishes a secure link between itself and the customer's browser 516. Any security protocol could be used, but the secure sockets layer ("SSL") protocol is preferred. After establishing a secure link, the Transaction Server prompts the customer for the necessary identification, delivery, and payment information 518.

In an alternate embodiment, the functions of establishing a secure link and getting the customer's payment information could be done in the Store Builder Server. The Transaction Server would then receive this information from the Store Builder Server, in an encrypted form, and decrypt it. This would provide an embodiment in which the Transaction Server did not need to interact in real-time with the customer, but merely provide a confirmation if desired.

The Transaction Server may, optionally, verify the credit card information, authorize the payment amount, and transfer the funds to the merchant's account 520. The Transaction Server would do this by using a third party credit card clearinghouse such as IC Verify or Automated Transaction Services (ATS). The merchant need not request this service from the Transaction Server, however. Low-volume merchants may prefer simply to be e-mailed (securely) or faxed the entire purchase order, and perform these functions themselves, thereby saving the associated cost that the transaction service provider would have charged. Additionally, the merchant may prefer to check his inventory before charging the customer.

In either case, the Transaction Server will notify the merchant of the status of the transaction and supply all of the product, customer, delivery, and payment information 522. If the customer provided an e-mail account, then the Transaction Server will also send a confirmation of the transaction to the customer 522.

The Transaction Server could also perform, in alternate embodiments, the functions of the Store Builder Server. In such an embodiment, the price URL would hyperlink to the Transaction Server which would contain the Java servlet that builds the Buy Page, and the Java servlet that maintains the shopping basket.

3. High-Level Functions Performed by each Server

Having explained the sequence of events and communications between the servers during a typical transaction, it will be instructive to summarize, individually, the functions performed by each of the servers.

a. Functions Performed by the Store Server

The Web storefront performs one basic service, and that is to present the multi-media content to the customer in order to let the customer shop. The format of this presentation is controlled by the merchant, and can easily be designed using the Development Tool disclosed in this application.

The Web storefront could have a variety of other functions associated with it. For instance, background information on the merchant, contact information, news items of interest to the merchant's customers, etc. can all be displayed on the Web storefront.

As discussed earlier, the merchant can control inventory and financial data in any manner desired. If the merchant utilizes a computer-based database, then the merchant can also interface this to the Web storefront. This could be used to supply information on backorders, quantities available, current prices, etc. to the customer. In a sophisticated system, the database could even possibly be interfaced electronically with the Transaction Server by creating a program that processes the e-mail order notifications sent by the Transaction Server.

b. Functions Performed by the Store Builder Server

The first major function of the Store Builder Server is to help the merchant get his Web storefront up and running. The Store Builder Server first provides the wizard applet or application, which allows the merchant to create his Web storefront. The Store Builder Server then accepts the HTML for the Web storefront from the merchant and builds the Web storefront. The Store Builder Server then publishes the Web storefront at a site of the merchant's choosing. The merchant supplies a user ID and a password to the Store Builder Server, and the Store Builder Server uses file transfer protocol ("FTP"), or some other service, to send the Web pages to the chosen hosting site.

The second major function of the Store Builder Server is to provide the shopping basket for the customer. The Store Builder Server places each product in the basket as the customer selects or buys them and holds them until the customer is ready to check out. At that point, the Store Builder Server transfers control, and the relevant information, to the Transaction Server.

c. Functions Performed by the Transaction Server

The Transaction Server has only one general responsibility, and that is to process the customer's information. This involves getting the information from the customer and transferring it to the merchant. As explained earlier, it may also involve verifying the information, getting the purchase authorized, and transferring the funds. Additionally, the Transaction Server can also send the customer a confirmation of the transaction.

Also of importance is the fact that the Transaction Server, like the Store Builder Server, need not know where the Store Server is located. That is, the Transaction Server does not require that the Store Server, or even the Store Builder Server, be at any particular Internet address. Even in an embodiment in which the Transaction Server also performed the functions of the Store Builder Server, the Transaction Server would not need to know where the Store Server was located. In such a case, the Transaction Server would receive the price URL with the product information. It is evident, however, that once the price URL is sent, the location of the Store Server (or rather, the location from which the price URL was sent) is, and needs to be, known. Knowing where the price URL was sent from (typically a page from the Store Server) allows the Transaction Server or the Store Builder Server to hyperlink the Web customer back there to continue shopping.

4. Advantages associated with the Preferred Embodiment a. Advantages for the Merchant The distributed electronic commerce system has a number of significant advantages for the merchant who desires to participate in electronic commerce. First, it is less expensive than the non-distributed system. The merchant need only buy the Development Tool to create the Web site, pay for hosting of the Web storefront at an ISP of the merchant's choice, and pay the charge for the transaction services (usually based on volume). Hosting fees can be as low as twenty dollars per month depending on the memory and the bandwidth required.

Second, it is much simpler to create the Web storefront than to create an ordinary electronic commerce Web site. The Development Tool, according to the present invention, allows the merchant to design, build, and publish a web site in a short period of time. It also makes it easy to modify the site. This is to be compared with the process of hiring a professional to do it, or with educating oneself about the process and doing it alone.

Third, it offers a great deal of control to the merchant. The merchant can redesign the site, change prices, decide to have a sale, add or delete products, update the site with pictures or other content, expand the number of places that offer the products for sale on-line, change hosting sites, and much more, all without even notifying the Store Builder Server or the Transaction Server. The merchant has almost complete control. The merchant can do anything the merchant wants with the site or with the information on the site. The only restriction is that the price URLs, which allow the Store Builder Server to build the Buy Pages, have to be included on the site, or elsewhere, in order for the Web customer to place an order. The merchant can even totally remove the Web storefront, and simply post the price URLs on news groups or on another web site.

It should be clear that the distributed electronic commerce system offers significant advantages to all merchants, particularly those of small to medium size.

b. Advantages for the Transaction Service Provider

There are a number of distinct advantages that the distributed electronic commerce system offers the transaction service provider. First, overhead is minimized. Much of the overhead and cost of hosting a commerce Web site comes from the bandwidth requirement. Every time that a Web site gets a "hit," information must be transmitted. If the transaction service provider chooses not to host the Web storefronts, then it does not have to process any of the hits associated with all of the shopping that occurs on the Web storefronts. The bandwidth usage will be even lower because, presumably, many of the merchants will choose to do their own credit card verification, thereby eliminating those transmissions as well. Further, in systems utilizing a Store Builder Server, the Transaction Server does not need to maintain the shopping baskets, nor process the hits associated with each of the buys.

Second, the amount of memory required is minimized. The Transaction Server does not need to host any of the Web storefronts, nor does it need to maintain any shopping baskets nor any information on the products being offered for sale by the merchants, nor does it need to keep any data regarding the Store Servers. In the preferred embodiment, the primary merchant-related data that the Transaction Server needs to store is a list of all of the registered merchants and their contact information. Clearly, however, Transaction Servers will want to keep track of sales so that they can bill the merchant's for their services, and may want to store additional information and statistics about the merchants as well.

Third, the barrier to entering into electronic commerce is lowered for the merchants. This benefits the transaction service provider because it opens up a whole new group of potential customers. These potential customers are the merchants who could not afford to do non-distributed Web commerce.

Fourth, the technique is also scalable. The transaction service provider can serve a much larger number of merchants with a given Transaction Server (due to the advantages above). If the number of sales grows and a particular Transaction Server reaches its threshold in memory or bandwidth, then the transaction service provider can simply add another Transaction Server and have the Store Builder Server direct some of the traffic to it. The Store Builder Server is also scalable, and if an additional server is needed due to volume it can be added. In that case, the provider can use the new server for future merchants or even direct current merchants to create any future price URLs (for new products or changes for existing products) using the new server.

5. Virtual Commerce

It is useful to broaden some of the concepts introduced or discussed above in order to see how they fit into the broader concept of virtual commerce. The merchant's web site, that is the actual web pages, can be considered to be a virtual store. The virtual store could span across one or more physical servers or computers, and these servers can collectively be referred to as the store server system. Analogously, the transaction service provider's web site can be considered to be a virtual cashier, spanning across a cashier server system comprised of one or more servers. The store builder server web site could be considered to be yet a third virtual entity, or it can more simply be considered to be either part of the virtual store or the virtual cashier.

Numerous criteria could be developed to determine when these virtual entities could be considered to be distributed. Some such criteria include: different servers or computers hosting the web sites; different processors executing the instructions associated with each web site, with each processor potentially accessing the same memory; or each web site merely responding to a different network address, possibly residing in the same memory on a common server, running on the same processor, and accessing the network over the same hardware such as a communications card. Each of these ideas is meant to be encompassed when referring to distributed systems.

These virtual stores and cashiers are presently displayed over the World Wide Web and the Internet, but future networks will surely arise for which virtual commerce will be applicable. Further, the present means of accessing and displaying virtual entities will change. Presently, web browsers running on personal computers processing HTML pages with HTTP requests and using URLs to link between pages is the preferred mechanism or system for customers to access the content. Software and computer technology will quickly replace many of these standards. Additionally, other technologies involving optics, magnetics, and other sciences could also produce viable methods of accessing and displaying virtual entities. Each of these potential advances could be used to enable a distributed commerce system over a network, and the present invention could be utilized to design the virtual storefronts and other virtual entities.

6. Detailed Description of the Development Tool a. Launching the Development Tool As explained earlier, in the preferred embodiment the Development Tool is downloaded from a Store Builder Server as either an applet or an application. The applet must be run on top of a Web browser and runs the standard Java security model procedure. For example, when using the applet from a local system, if the developer wishes to incorporate an image which resides on the same local system, then he must upload the image to a servlet on the Store Builder Server and then download the image into the applet on the local system. The application version, on the other hand, will allow the developer to have complete access to the local machine. For this and other reasons, the application will also run faster than the applet.

The applet also has advantages, and these stem from the fact that the applet sits on an HTML page and is downloaded as needed by the customer's Web browser. The developer will, therefore, always have the latest version and no local disk space will be required.

b. Building a Page

The Development Tool is object-oriented and template-driven, and it enables its customer, which is the merchant, to design a web site in only a few minutes and does not require any special Internet knowledge from the merchant. The Development Tool breaks the design process down into four steps. The first is to select a Web site category. The second is to collect optional page header and footer information. The third is to choose the defaults for the background color or image and for the page style. The fourth is to fill in the content of each page. These steps and the details of executing them could certainly be modified without deviating from the scope of this invention. Each of the four steps will be further explained below with the aim of describing how the Development Tool operates and how the merchant designs a page.

Figure 6:
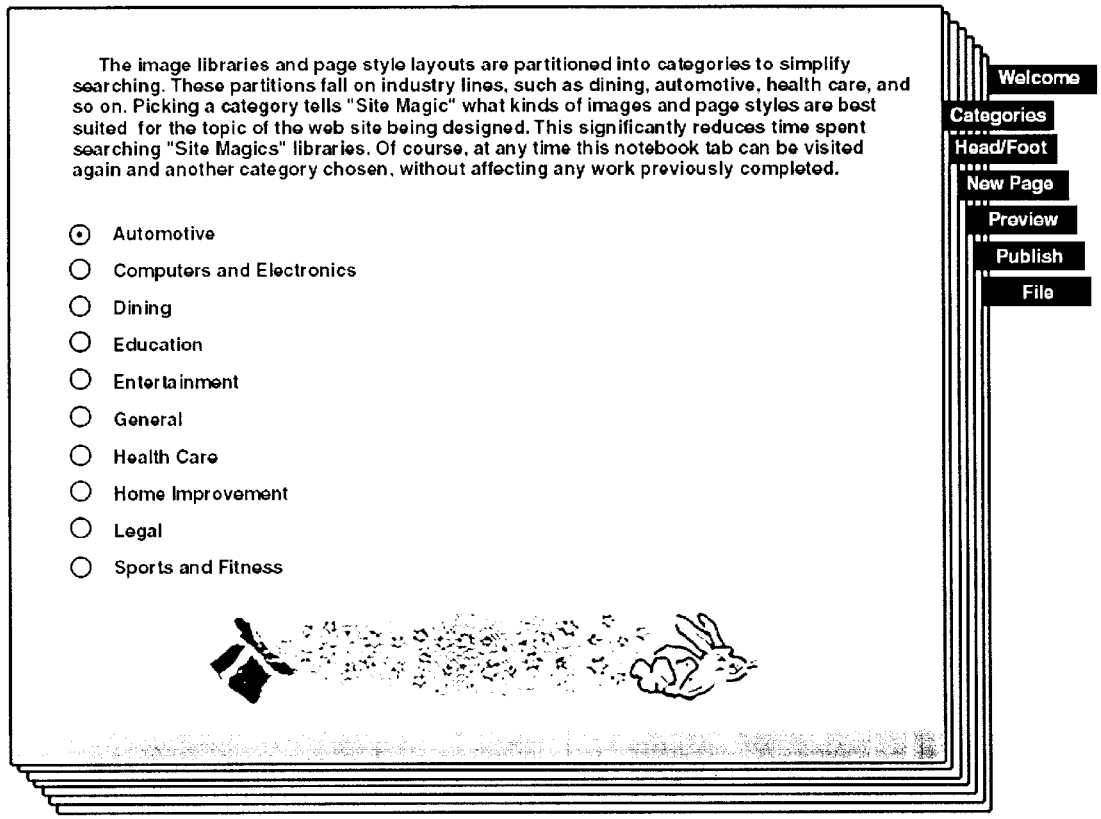
FIG. 6 is a screen depicting categories, according to the present invention.

The first step is to select a category. The category is selected from a list of ten industries such as automotive, dining, and education. Referring to FIG. 6, there is shown a screen 600 containing a list of possible industries to choose from in the Development Tool. Alternate embodiments could employ different industries and a different number of choices. The list 600 also illustrates the simplicity of the merchant interface. The selected category is used by the Development Tool to preselect the image libraries and page style libraries that will be used in the fourth step. The Development Tool thus simplifies for the merchant the processes of finding appropriate clip art and page styles.

Figure 7:
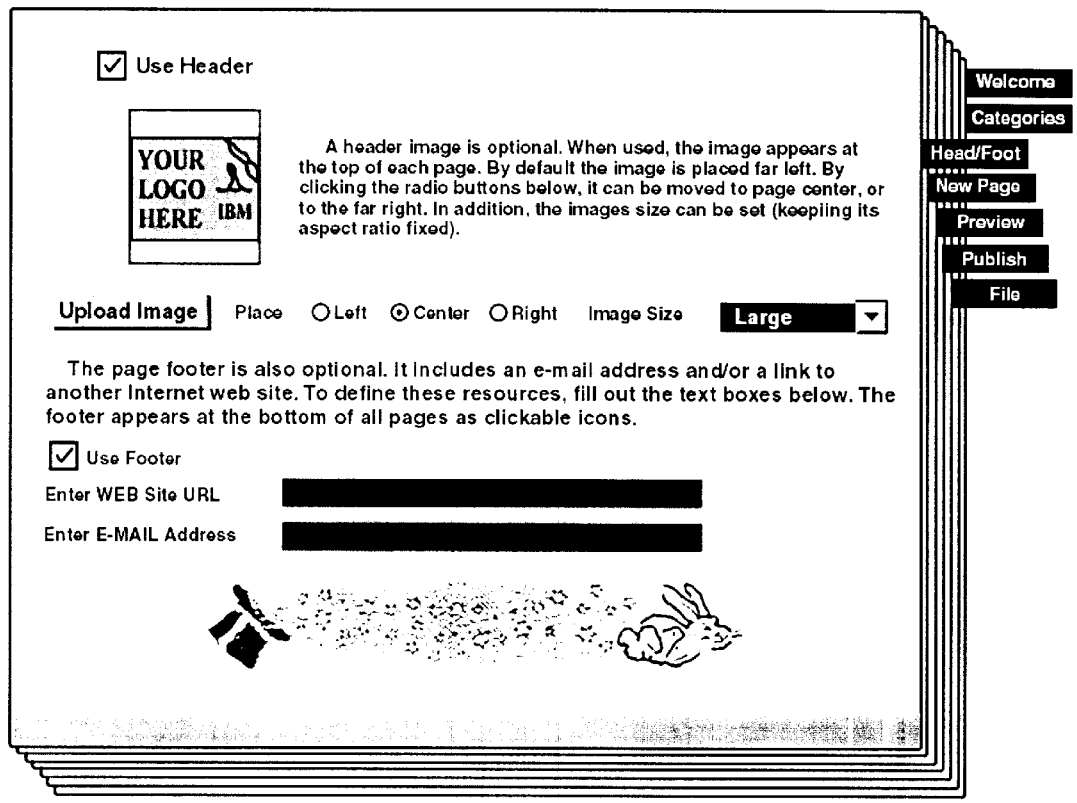
FIG. 7 is a screen for creating a header and footer for a Web page, according to the present invention.

The second step is to create the default header and footer. The page header and footer are typically used for the company name and logo. An email address and a link URL are also commonly included. As with many of the features of the Development Tool, the field size may be adjusted and images may be loaded. In this case, the height of the header, for example, may need to be increased in order to accommodate a particular company logo. Referring to FIG. 7, there is shown a screen 700 in which the merchant is prompted to enter the information for the header and the footer. The screen 700 further illustrates the simplicity of the merchant interface.

The third step is to select the default background, which may be a color or an image, and page style. The Development Tool simplifies the process of choosing by offering grids of selections. The color grid, or pallet, contains 16 different colors. This color pallet can be used or the merchant can define his own. Similarly, a grid of clip art images is available for the merchant to choose from for background images. These default conditions for each page constitute a template, and begin to illustrate the template-driven nature of the Development Tool. The default background may be separately changed by the merchant for any particular page.

Figure 8:
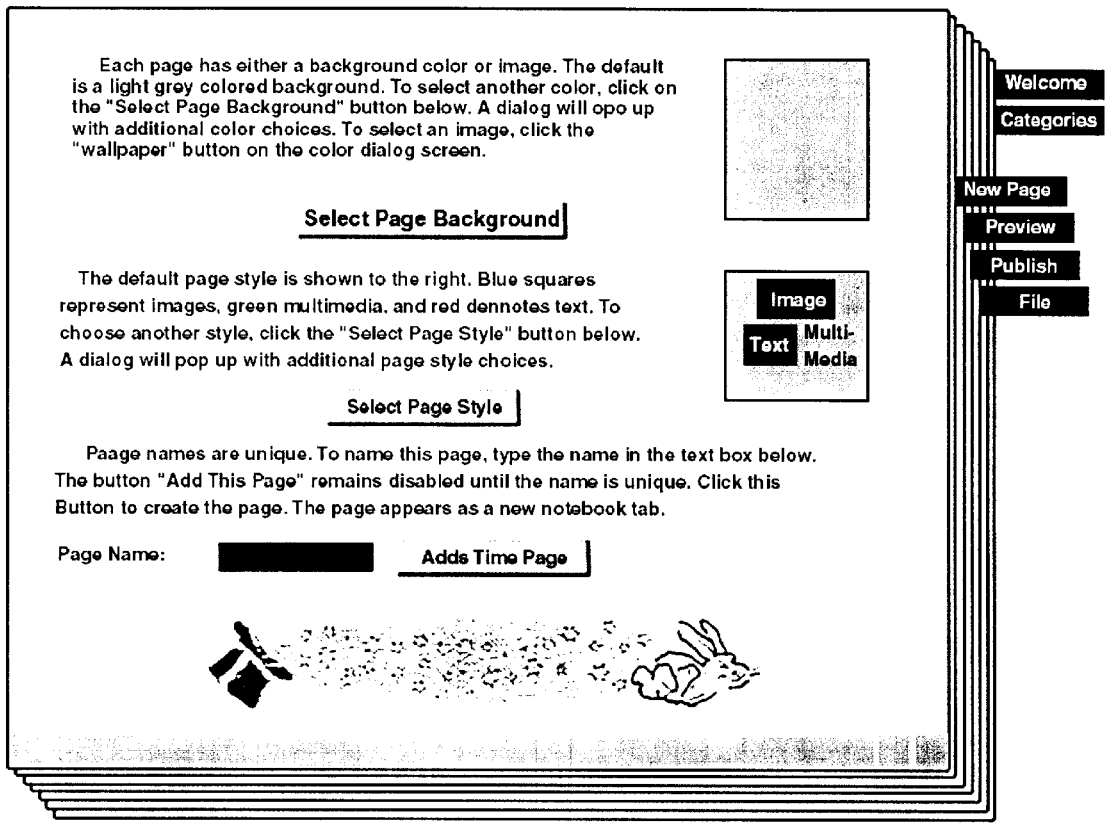
FIG. 8 is a screen for selecting a background and style for a Web page, according to the present invention.
Figure 9:
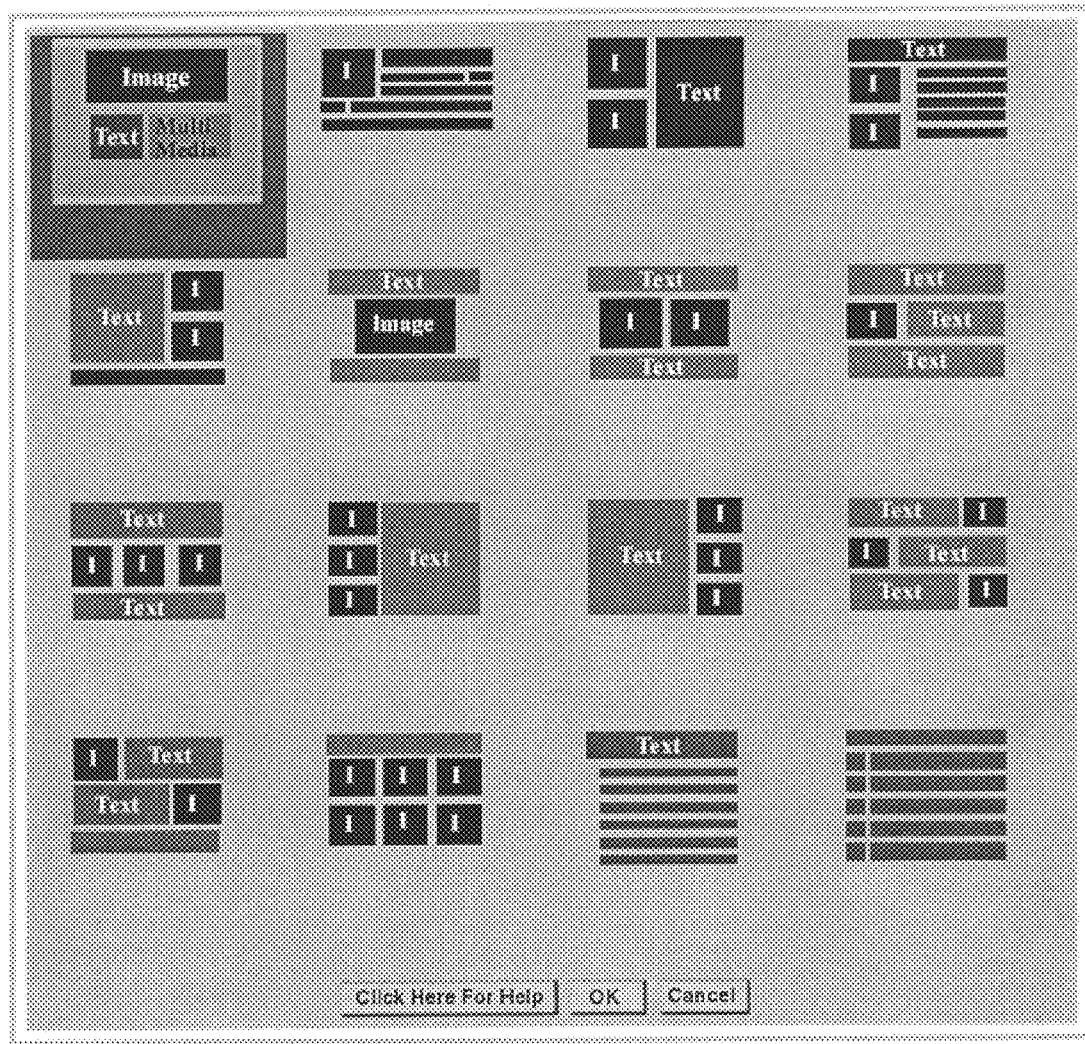
FIG. 9 shows various page styles for a Web page, according to the present invention.
Figure 10:
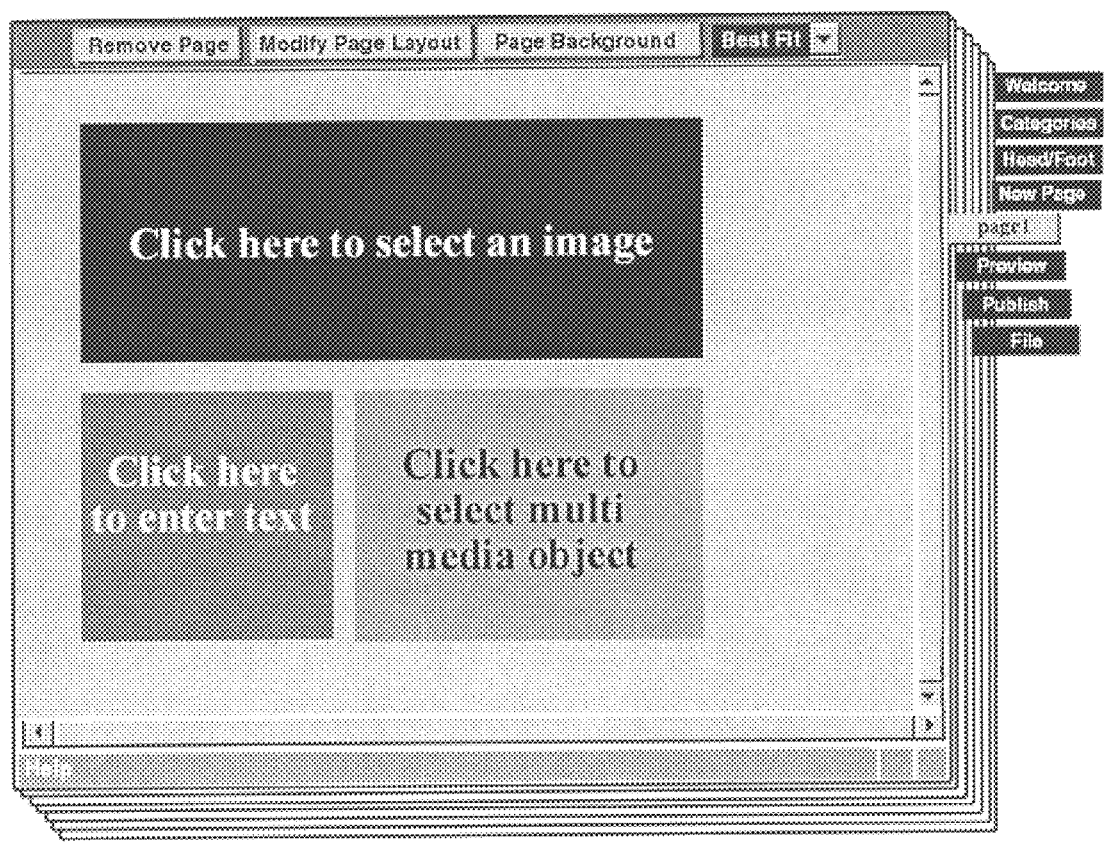
FIG. 10 shows a single page style for a Web page, according to the present invention.

Page styles allocate certain portions of each page to text, images, multimedia, etc. The style thus provides a template for all of the different content-related objects ("style components") that will appear on a page. Although the position and sizes of the style components are defined by the style, they can be changed by the merchant for any page. Referring to FIG. 8, there is shown a screen 800 which prompts the merchant to select a background and a style for the page. Page styles are further elaborated in FIG. 9, and FIG. 10 shows one style or template in isolation.

Figure 11:
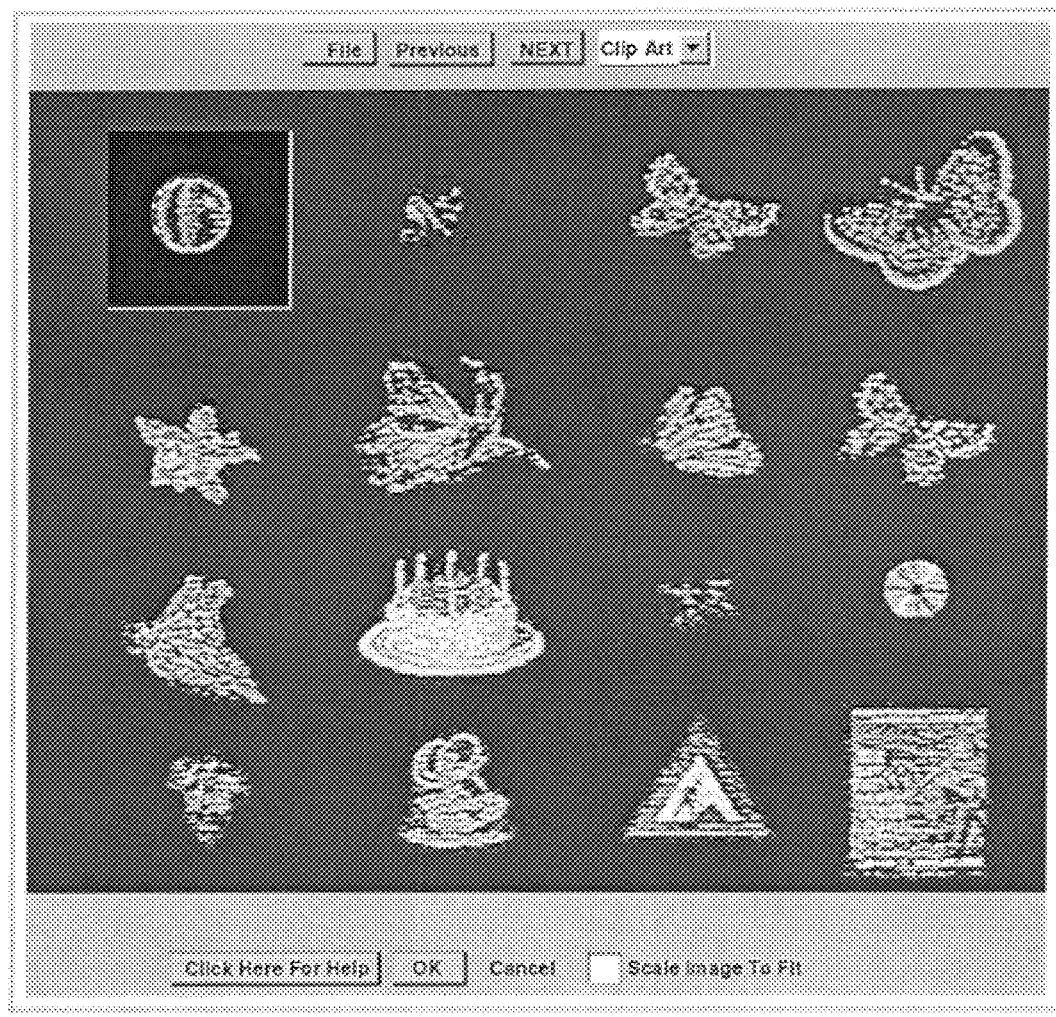
FIG. 11 is a dialog box for an image style component, according to the present invention.
Figure 12:
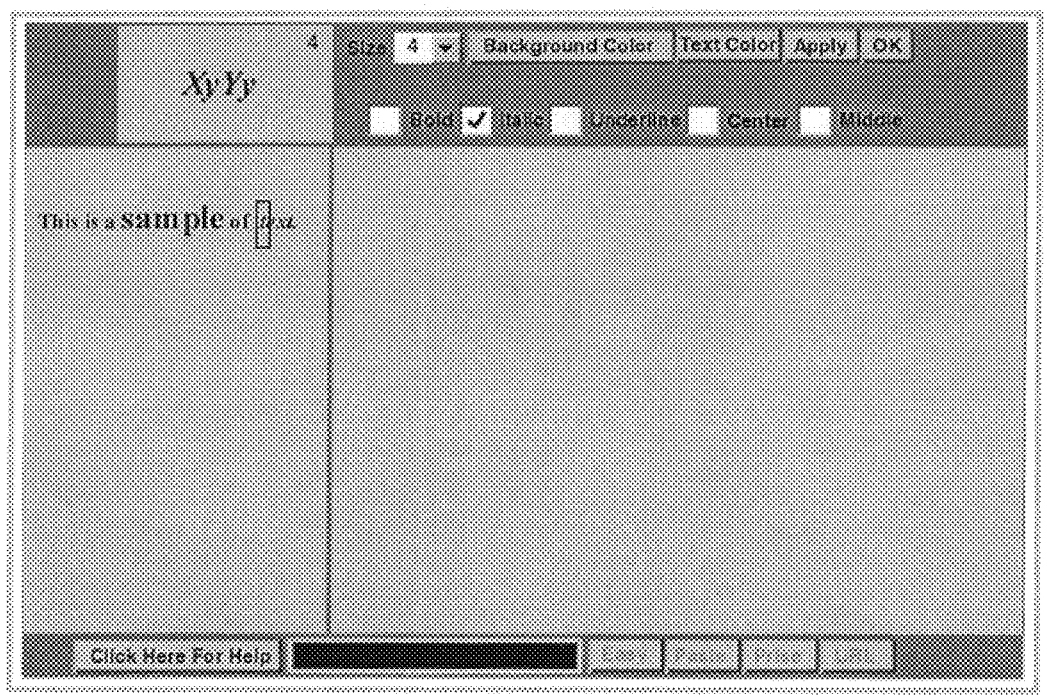
FIG. 12 is a dialog box for a text style component, according to the present invention.
Figure 13:
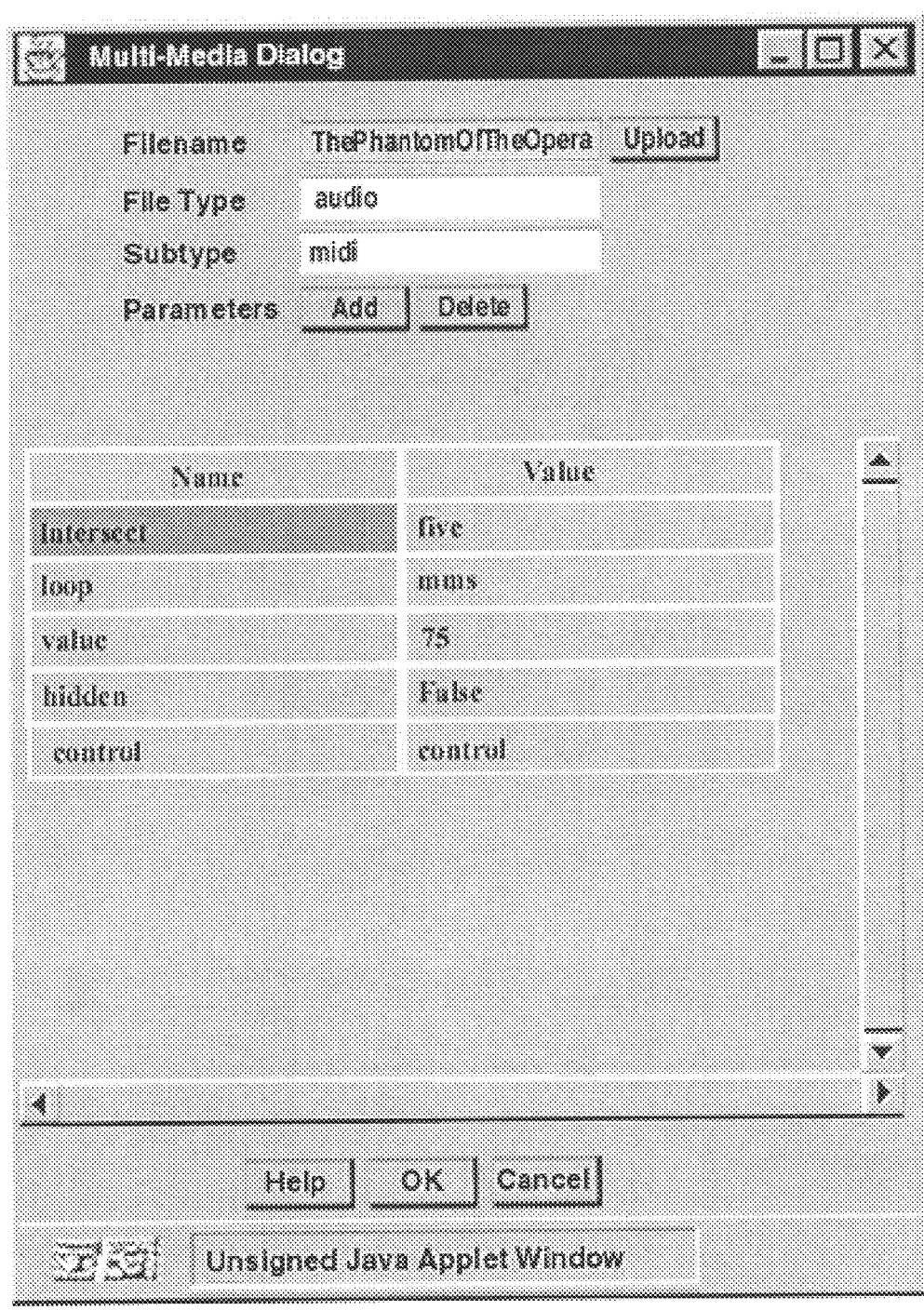
FIG. 13 is a dialog box for a multimedia style component, according to the present invention.

The fourth step is to fill in the content for each of the style components. As shown, for example, in FIG. 10, each of the style components must be filled in. To do this, the merchant clicks on the style component and the Development Tool presents a "dialog" box which steps the merchant through the choices necessary to fill in the style component. FIGS. 11–13 show dialog boxes for image, text, and multimedia style components, respectively. For images, the merchant is presented with a selection, but may use other images as well. It is common for a merchant to scan logos and images that the merchant wants to use on his Web site. Any style component can also have a URL attached to it, and the dialog box allows the merchant to select this option.

Each page created by the merchant can, as mentioned earlier, be modified. Style components can be added, deleted, moved, resized, etc. Another feature of the Development Tool is that it presents the page just as a Web customer will see it. This feature, called WYSIWYG for "what you see is what you get" allows the merchant to see, without publishing and browsing, what the published page will look like when it is published. Additionally, the Development Tool also provides a previewing option which uploads all of the pages and allows the merchant to view the entire Web site with a Web browser.

Figure 14:
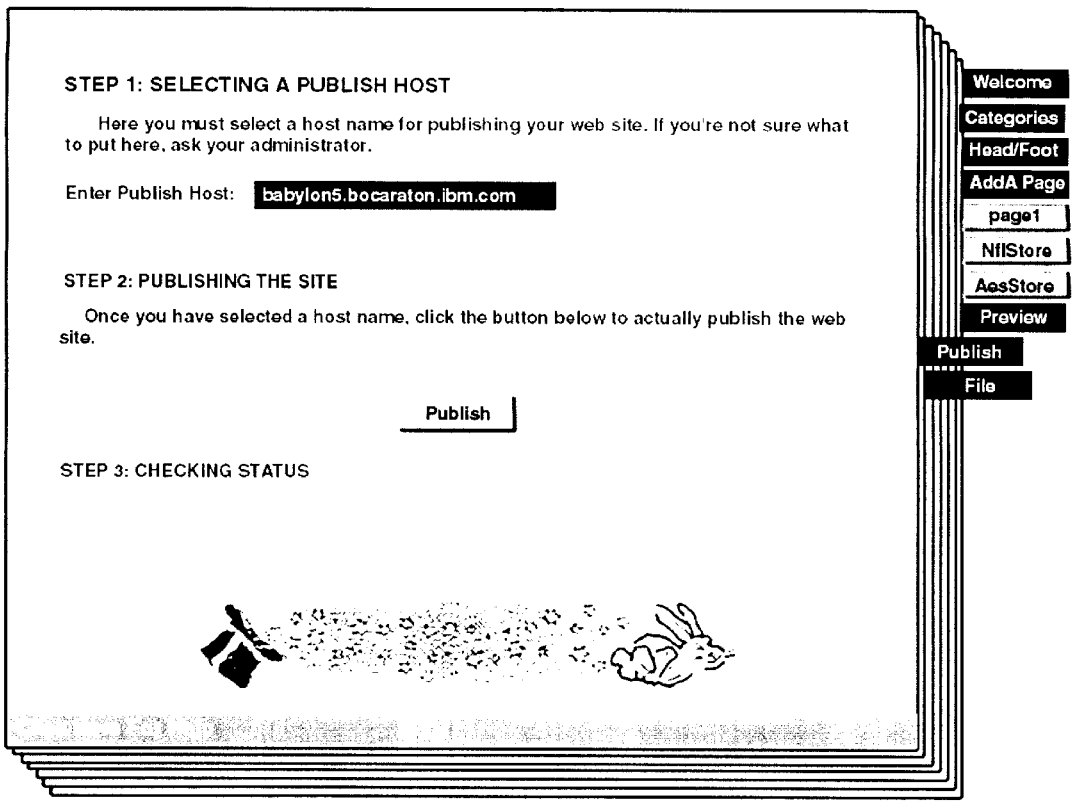
FIG. 14 is a screen for publishing a Web page, according to the present invention.

When the pages are all created, the Development Tool allows the merchant to upload or publish the Web pages to a site specified by the merchant. The merchant must, of course, provide the login ID and password. FIG. 14 shows a screen which prompts the merchant for the publishing information.

c. Interfacing with a Distributed Electronic Commerce System

Figure 15:
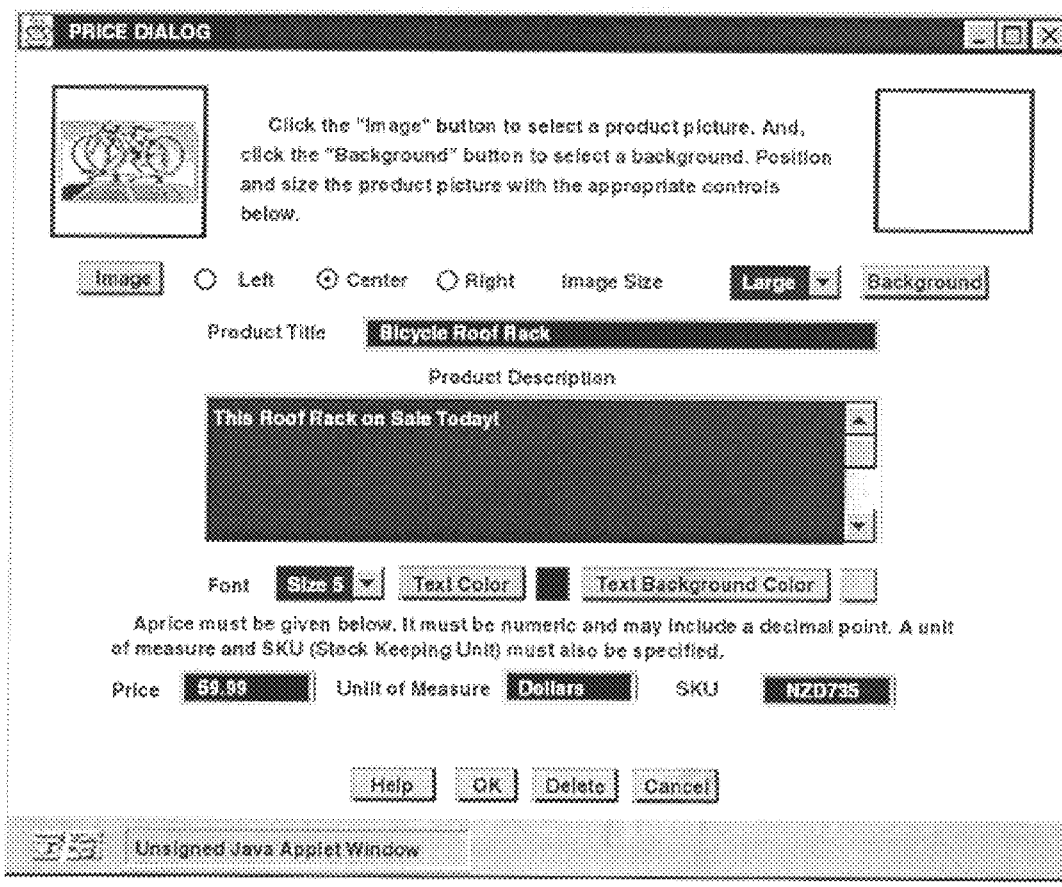
FIG. 15 is a dialog box for a price Uniform Resource Locator ("URL"), according to the present invention.

The Development Tool can be used to support a variety of electronic commerce models. The preferred embodiment uses a special URL referred to as a "price URL." A price URL is a link to the Java servlets residing, in the preferred embodiment, on the Store Builder Server and can be attached to any style component. The Web customer would then select, for example by clicking with a mouse, the style component in order to buy the product which it describes. Alternate embodiments could use the price URLs to link straight to the Transaction Server, or to another site. The price URL has attached an encrypted message that contains a text description of the item for sale, including a picture, its costs, quantity of measure, the merchant's ID, several fields used to customize the Buy Page that is created from the attached data, and a special signature from the Store Builder Server. The encoding is done with the public key of the Store Builder Server, but other encryption means are possible. The signature assures that the price URL was created by the Store Builder Server, and therefore guarantees that the price and the other data associated with the URL were originally created and sanctioned by the merchant. FIG. 15 shows the dialog page for the price URL.

Figure 16:
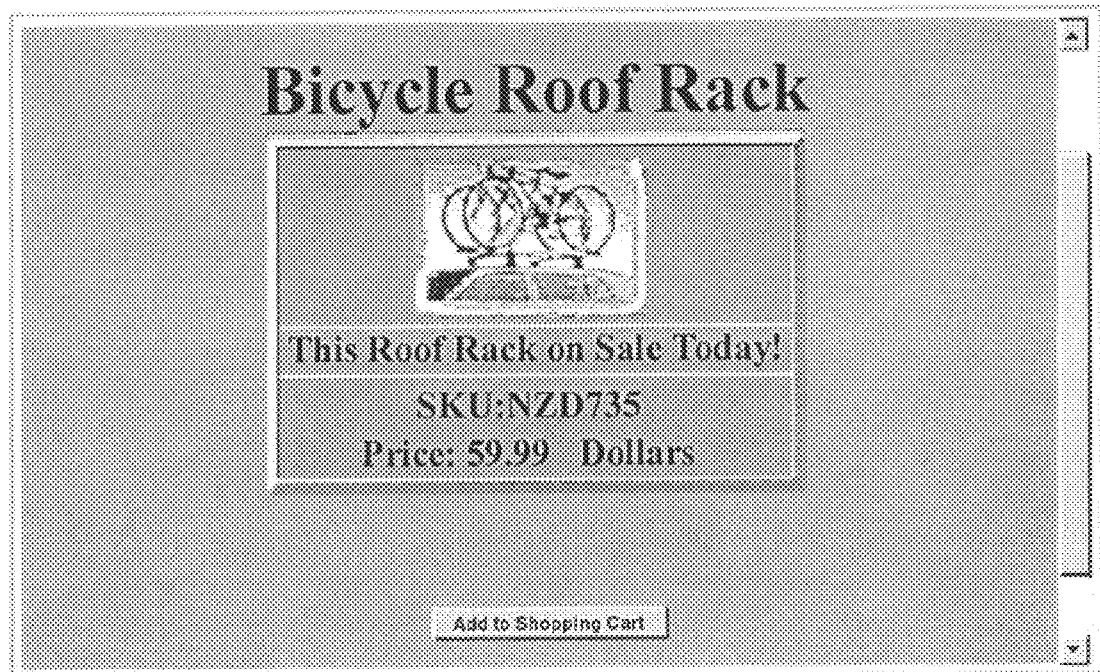
FIG. 16 is a Buy Page, according to the present invention.

The Store Builder Server is able to decrypt the price URL data and convert it into an HTML page (a Buy Page). A typical Buy Page is shown in FIG. 16, and its purpose and operation has been explained earlier. Another Java servlet on the Store Builder Server preserves the state between HTTPd requests in the shopping basket. The shopping basket keeps track of the data portion of the price URL for all items that a shopper wants to buy from the Web pages.

d. Adaptability of the Development Tool's Interfaces

The Development Tool is also adaptable to different levels of merchant requirements and/or sophistication. It offers 5 different levels of functionality depending on what the merchant needs or desires. These are called, from the simplest to the most robust: Web Card, Basic, Standard, Commerce, and Advanced. This feature is quite valuable in that a single interface cannot meet every merchant's needs. The simplest mode should appeal both to merchants that require only a small Web site and to merchants that require a larger Web site but are not proficient with the Web and with computers. A more advanced mode, however, can save the proficient merchant time, as well as provide more functionality.

The look and feel of the Development Tool can also be adapted. The Tool incorporates a particular look and feel which includes a large number of items that affect the presentation of information to the tool user. Examples include the use of icons, radio buttons, using tabs to show other features available, etc. As mentioned in the introduction, a merchant may not like the standard tool look and feel or may simply want a different one for a variety of reasons. The Development Tool is an object-oriented application, and its look and feel is provided by a Java class. This class can be removed and another used in its place in order to provide a different look and feel.

7. General Implementation

Development Tools, for merchants desiring to create Web pages for electronic commerce systems, in accordance with the present invention, can be, at least partially, implemented by hardware, software, or a combination of both. This may be done for example, by a Java application running on a variety of host equipment. Moreover, this functionality may be embodied in computer readable media such as 3.5 inch diskettes to be used in programming an information-processing apparatus to perform in accordance with the invention. This functionality may also be embodied in computer readable media such as a transmitted waveform to be used in transmitting the information or functionality.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

We claim:

1. A method for designing an e-commerce Web page for the purchase of one or more items therefrom, the e-commerce Web page to be hosted on a Web page server with distributed payment processing system hosted on a payment server, the method comprising:
   a. providing an object-oriented, template-driven interface for a customer to utilize in the design of the Web page;
   b. allowing the customer, through the use of the interface, to design the Web page;
   c. gathering from the customer, a price URL containing pricing information for at least one item offered for purchase on the Web page designed by the customer;
   d. placing the price URL on the Web page so that when the price URL is selected by a consumer using a browser, the price URL preforms the steps of:
      establishing a direct secure link between an application running on a payment server and the customer using the browser, so that the direct secured link is established without the use of any intermediate database lookups and database calls prior to the direct secure link being established between the application and the browser;
      building a Web page from the price URL that is presented to the consumer using the browser including the item offered for purchase and a purchase price and an authorization icon; and
      receiving consumer payment information after the consumer authorizes the purchase by selection of the authorization icon; and
   e. publishing the Web page at a destination of the customer's choosing.

2. The method of claim 1, wherein:
   a) the step of providing an interface comprises the steps of:
      i) providing a menu of page styles and backgrounds for the customer to select from for use in the Web page; and
      ii) providing a menu of industries for the customer to select from, which will be used to tailor the above selection of page styles and backgrounds, and
   b) the step of allowing the customer to design a Web page comprises the steps of:
      i) allowing the customer to select an industry; and
      ii) allowing the customer to select a page style and a background.

3. The method of claim 1, wherein the step of providing an interface comprises the step of providing a plurality of modes in which the interface can be used, wherein each mode offers a different level of functionality.

4. The method of claim 1, wherein:
   a) the step of providing an interface comprises the step of providing a look-and-feel Java class which provides the look-and-feel for the Web page; and b) the step of allowing the customer to design the Web page comprises the step of allowing the customer to modify the look-and-feel Java class in order to provide a different look-and-feel for the Web page.

5. A method for designing an e-commerce Web page for the purchase of one or more items therefrom, the e-commerce, the Web page for use in a distributed electronic commerce system comprising a Web page server and a second server, wherein the Web page server is electrically coupled to the second server, and wherein the Web page is to be hosted on the Web page server, the method comprising:
   a. providing an object-oriented, template-driven interface for a user to utilize in the design of a Web page hosted on the Web page server, including the sub-steps of:
      i. receiving user's selection of a plurality of predefined template options for the layout of the web page;
      ii. receiving user's input for the description of at least one item for purchase from the Web page including the purchase price of the item; and
      iii. generating a price URL associated with the at least one item for purchase, wherein the price URL contains information for the at least one item of purchase and the purchase price;
   b. receiving the user's designation of the Web page such that the price URL can be embedded into the Web page during the purchase of the item by a user viewing the Web page using a browser;
   c. providing a secure link between a consumer using a browser and a second web server for payment processing when the price URL is selected by the consumer using the browser viewing the Web page so that the secured link is established without the use of any intermediate database lookups and database calls prior to the secure link being established between the second web server and the browser;
   d. sending to the browser a confirmation web page built on the second web server when the consumer selects a price URL wherein the confirmation web page includes the information in the price URL selected by the consumer including the information for the at least one item of purchase and the purchase price and an authorization icon; and
   e. waiting for the consumer's authorization of the confirmation web page by the consumer's selection of the authorization icon and if the authorization is received then prompting the consumer for payment information to be sent over the secure link to the second web server.

6. The method of claim 5, further comprising the step of incorporating multimedia content into the Web page.

7. The method of claim 6, wherein the step of generating a price URL includes generating a price URL for providing a hyperlink to the second server and comprising all the data necessary to describe a product and to identify a Web merchant who operates the Web page on the Web page server.

8. The method of claim 6, further comprising the step of publishing the Web page at a destination of the customer's choosing.

9. A computer readable medium containing program instructions for designing an e-commerce Web page for the purchase of one or more items therefrom, the e-commerce Web page to be hosted on a Web page server with distributed payment processing system hosted on a payment server, the program instructions comprising:
   a. providing an object-oriented, template-driven interface for a customer to utilize in the design of the Web page;

b. allowing the customer, through the use of the interface, to design the Web page; and c. gathering from the customer, a price URL containing pricing information for at least one item offered for purchase on the Web page designed by the customer;

d. placing the price URL on the Web page so that when the price URL is selected by a consumer using a browser, the price URL performs the steps of:

establishing a direct secure link between an application running on a payment server and the customer using the browser, so that the direct secured link is established without the use of any intermediate database lookups and database calls prior to the direct secure link being established between the application and the browser;

building a Web page from the price URL that is presented to the consumer using the browser including the item offered for purchase and a purchase price and an authorization icon; and receiving consumer payment information after the consumer authorizes the purchase by selection of the authorization icon; and e. publishing the Web page at a destination of the customer's choosing.

10. The medium of claim 9, wherein:

a) the instructions for providing an interface comprise:
   i) providing a menu of page styles and backgrounds for the customer to select from for use in the Web page; and
   ii) providing a menu of industries for the customer to select from, which will be used to tailor the above selection of page styles and backgrounds, and b) the instructions for allowing the customer to design a Web page comprise:
   i) allowing the customer to select an industry; and
   ii) allowing the customer to select a page style and a background.

11. The medium of claim 9, wherein the instructions for providing an interface comprise providing a plurality of modes in which the interface can be used, wherein each mode offers a different level of functionality.

12. The medium of claim 9, wherein:

a) the instructions for providing an interface comprise providing a look-and-feel Java class which provides the look-and-feel for the Web page; and b) the instructions for allowing the customer to design the Web page comprise allowing the customer to modify the look-and-feel Java class in order to provide a different look-and-feel for the Web page.

13. A computer readable medium containing program instructions for designing an e-commerce Web page for the purchase of one or more items therefrom, the e-commerce, the Web page for use in a distributed electronic commerce system comprising a Web page server and a second server for payment processing, wherein the Web page server is electrically coupled to the second server, and wherein the Web page is to be hosted on the Web page server, the program instructions comprising:

a. providing an object-oriented, template driven interface for a user to utilize in the design of a Web page hosted on the Web page server, including the sub-steps of:
   i. receiving user's selection of a plurality of predefined template options for the layout of the web page;
   ii. receiving user's input for the description of at least one item for purchase from the Web page including the purchase price of the item; and
   iii. generating a price URL associated with the at least one item for purchase, wherein the price URL contains information for the at least one item of purchase and the purchase price;

b. receiving the user's designation of the Web page such that the price URL can be embedded into the Web page during the purchase of the item by a user viewing the Web page using a browser;

c. providing a secure link between a consumer using a browser and a second web server for payment processing when the price URL is selected by the consumer using the browser viewing the Web page so that the secured link is established without the use of any intermediate database lookups and database calls prior to the secure link being established between the second web server and the browser;

d. sending to the browser a confirmation web page built on the second web server when the consumer selects a price URL wherein the confirmation web page includes the information in the price URL selected by the consumer including the information for the at least one item of purchase and the purchase price and an authorization icon; and e. waiting for the consumer authorization of the confirmation web page by the consumer's selection of the authorization icon and if the authorization is received then prompting the consumer for payment information to be sent over the secure link to the second web server.

14. The medium of claim 13, further comprising instructions for incorporating multimedia content into the Web page.

15. The medium of claim 13, wherein the instructions of generating a price URL includes generating a price URL for providing a hyperlink to the second server and comprising all the data necessary to describe a product and to identify a Web merchant who operates the Web page on the Web page server.

16. The medium of claim 13, further comprising instructions for publishing the Web page at a destination of the customer's choosing.

17. A Web page design system, for designing an e-commerce a Web page for the purchase of one or more items therefrom, the e-commerce Web page to be hosted on a Web page server with distributed payment processing system hosted on a payment server, the Web page design system, comprising:

a. means for providing an object-oriented, template-driven interface for a customer to utilize in the design of the Web page;

b. means for allowing the customer, through the use of the interface, to design the Web page; and c. means for gathering from the customer, a price URL containing pricing information for at least one item offered for purchase on the Web page designed by the customer;

d. means for placing the price URL on the Web page so that when the price UTRL is selected by a consumer using a browser, the price URL performs the steps of:

establishing a direct secure link between an application running on a payment server and the customer using the browser, so that the direct secured link is established without the use of any intermediate database lookups and database calls prior to the direct secure link being established between the application and the browser;

building a Web page from the price URL that is presented to the consumer using the browser including the item offered for purchase and a purchase price and an authorization icon; and receiving consumer payment information after the consumer authorizes the purchase by selection of the authorization icon; and e. means for publishing the Web page at a destination of the customer's choosing.

18. The system of claim 17, wherein:

a) the means for providing an interface comprises:
  i) means for providing a menu of page styles and backgrounds for the customer to select from for use in the Web page; and
  ii) means for providing a menu of industries for the customer to select from, which will be used to tailor the above selection of page styles and backgrounds, and b) the means for allowing the customer to design a Web page comprises:
  i) means for allowing the customer to select an industry; and
  ii) means for allowing the customer to select a page style and a background.

19. The system of claim 17, wherein the means for providing an interface comprises means for providing a plurality of modes in which the interface can be used, wherein each mode offers a different level of functionality.

20. The system of claim 17, wherein:

a) the means for providing an interface comprises means for providing a look-and-feel Java class which provides the look-and-feel for the Web page; and b) the means for allowing the customer to design the Web page comprises means for allowing the customer to modify the lookand-feel Java class in order to provide a different look-and-feel for the Web page.

21. A Web page design system for designing an e-commerce Web page for the purchase of one or more items therefrom, the e-commerce, the Web page for use in a distributed electronic commerce system, the distributed commerce system comprising a Web page server and a second server for payment processing, wherein the Web page server is electrically coupled to the second server, and wherein the Web page is to be hosted on the Web page server, the system comprising:

a. means for providing an object-oriented, template-driven interface for a user to utilize in the design of a Web page hosted on the Web page server, including:
  i. means for receiving user's selection of a plurality of predefined template options for the layout of the web page;
  ii. means for receiving user's input for the description of at least one item for purchase from the Web page including the purchase price of the item; and
  iii. means for generating a price URL associated with the at least one item for purchase, wherein the price URL contains information for the at least one item of purchase and the purchase price;

b. means for receiving the user's designation of the Web page such that the price URL can be embedded into the Web page during the purchase of the item by a user viewing the Web page using a browser;

c. means for providing a secure link between a consumer using a browser and a second web server for payment processing when the price URL is selected by the consumer using the browser viewing the Web page so that the secured link is established without the use of any intermediate database lookups and database calls prior to the secure link being established between the second web server and the browser;

d. means for sending to the browser a confirmation web page built on the second web server when the consumer selects a price URL wherein the confirmation web page includes the information in the price URL selected by the consumer including the information for the at least one item of purchase and the purchase price and an authorization icon; and e. means for waiting for the consumer's authorization of the confirmation web page by the consumer's selection of the authorization icon and if the authorization is received then prompting the consumer for payment information to be sent over the secure link to the second web server.

22. The system of claim 21, further comprising means for incorporating multimedia content into the Web page.

23. The system of claim 21, wherein the means for generating a price URL includes generating a price URL for providing a hyperlink to the second server and comprising all the data necessary to describe a product and to identify a Web merchant who operates the Web page on the Web page server.

24. The system of claim 21, further comprising means for publishing the Web page at a destination of the customer's choosing.

* * * * *